United States Patent
Kinouchi et al.

(10) Patent No.: US 7,544,445 B2
(45) Date of Patent: Jun. 9, 2009

(54) POLYELECTROLYTE MEMBRANE AND PRODUCTION METHOD THEREFOR

(75) Inventors: Masayuki Kinouchi, Ube (JP); Tetsuji Hirano, Ube (JP); Nobuharu Hisano, Ube (JP)

(73) Assignee: Ube Industries, Ltd., Ube-Shi (JP)

( * ) Notice: Subject to any disclaimer, the term of this patent is extended or adjusted under 35 U.S.C. 154(b) by 781 days.

(21) Appl. No.: 10/518,026

(22) PCT Filed: Jun. 18, 2003

(86) PCT No.: PCT/JP03/07740

§ 371 (c)(1),
(2), (4) Date: Dec. 15, 2004

(87) PCT Pub. No.: WO04/001771

PCT Pub. Date: Dec. 31, 2003

(65) Prior Publication Data

US 2005/0221193 A1 Oct. 6, 2005

(30) Foreign Application Priority Data

| Jun. 19, 2002 | (JP) | ............................ 2002-177965 |
| Jul. 17, 2002 | (JP) | ............................ 2002-207804 |
| Jul. 30, 2002 | (JP) | ............................ 2002-221156 |

(51) Int. Cl.
*H01M 8/18* (2006.01)
*C08G 63/00* (2006.01)

(52) U.S. Cl. ........................ 429/315; 429/314; 429/304; 528/179

(58) Field of Classification Search .............. 429/231.1, 429/231.5, 223, 314, 315, 304; 528/179
See application file for complete search history.

(56) References Cited

U.S. PATENT DOCUMENTS 5,494,991 A * 2/1996 Kaneko et al. ............... 528/179

(Continued)

FOREIGN PATENT DOCUMENTS

JP 6-287336 10/1994

(Continued)

OTHER PUBLICATIONS

Kim et al., Highly Conductive Polymer Electrolytes Supported By Microporous Membrane, Solid State Ionics 144 (2001) 329-337.*

(Continued)

*Primary Examiner*—Dah-Wei D Yuan
*Assistant Examiner*—Zachary Best
(74) *Attorney, Agent, or Firm*—Young & Thompson

(57) ABSTRACT

A polymer electrolyte membrane comprising a microporous polymer membrane having pores penetrating through the opposite sides thereof. The microporous polymer membrane holds a mixture of a polymer and a molten salt at a weight ratio of 1/99 to 99/1 and/or a molten salt. The polymer electrolyte membrane is inexpensive, durable, excellent in mechanical strength, excellent in structural retention in high temperatures, and capable of stably holding a molten salt in its porous polymer membrane structure, shows high heat resistance, and secures high ionic conductivity in the absence of water or a solvent and is therefore useful in fuel cells, secondary batteries, electric double layer capacitors, electrolytic capacitors, and the like.

12 Claims, 2 Drawing Sheets

U.S. PATENT DOCUMENTS

| | | | | |
|---|---|---|---|---|
| 5,858,264 | A * | 1/1999 | Ichino et al. | 252/62.2 |
| 6,248,480 | B1 * | 6/2001 | Narang et al. | 429/314 |
| 6,630,518 | B1 * | 10/2003 | Paronen | 521/50.5 |
| 6,666,969 | B1 * | 12/2003 | Funaoka et al. | 210/500.36 |
| 6,815,124 | B2 * | 11/2004 | Suzuki et al. | 429/303 |
| 7,029,793 | B2 * | 4/2006 | Nakagawa et al. | 429/231.1 |

FOREIGN PATENT DOCUMENTS

| | | |
|---|---|---|
| JP | 7-37604 | 2/1995 |
| JP | 07-118480 | 5/1995 |
| JP | 08-245828 | 9/1996 |
| JP | 10-083821 | 3/1998 |
| JP | 10-92467 | 4/1998 |
| JP | 10-265673 | 10/1998 |
| JP | 11-086632 | 3/1999 |
| JP | 11-86905 | 3/1999 |
| JP | 11-306858 | 11/1999 |
| JP | 2000-003620 | 1/2000 |
| JP | 2000-011753 | 1/2000 |
| JP | 2000-154273 | 6/2000 |
| JP | 2000-182672 | 6/2000 |
| JP | 2001-330968 | 11/2001 |
| JP | 2002-3478 | 1/2002 |
| JP | 2003-229336 | 8/2003 |
| JP | 2003-257484 | 9/2003 |
| WO | WO00/20493 | * 4/2000 |
| WO | WO01/86748 | * 11/2001 |
| WO | WO 01/86748 | 11/2001 |

OTHER PUBLICATIONS

Noda et al., "Highly conductive polymer electrolytes prepared by in situ polymerization of vinyl monomers in room temperature molten salts", Electrochimica Acta 45, 2000, pp. 1265-1270.

Doyle et al., "High-Temperature Proton Conducting Membranes Based on Perfluorinated Ionomer Membrane-Ionic Liquid Composites", Journal of The Electrochemical Society, 2000, pp. 34-37.

Sun et al., "Acid-Organic base swollen polymer membranes", Electrochimica Acta 46, 2001, pp. 1703-1708.

Kim, Dong-Won et al.; "Highly conductive polymer electrolytes supported by microporous membrane", Solid State Ionics, vol. 144, No. 3-4, 2001, pp. 329-337, XP 004320573.

Wang, Y et al.: "Polymer gel electrolyte supported with microporous polyolefin membranes for lithium ion polymer battery". Solid State Ionics, vol. 148, No. 3-4, 2002, pp. 443-449, XP-004361843.

* cited by examiner

POLYELECTROLYTE MEMBRANE AND PRODUCTION METHOD THEREFOR

TECHNICAL FIELD

The present invention relates to a polymer electrolyte membrane and, more particularly, a polymer electrolyte membrane useful in fuel cells, secondary batteries, electric double layer capacitors, electrolytic capacitors, etc.

BACKGROUND ART

Secondary batteries such as lithium ion batteries contain a porous polymer membrane impregnated with an electrolytic solution as a separator between a cathode and an anode. The electrolytic solution is volatile and flammable, which is problematical for safety when leakage occurs.

It is known that ammonium salts of certain kinds, such as imidazolium salts and pyridinium salts, become liquid molten salts at 100° C. or lower, particularly around room temperature, and exhibit high ionic conductivity at relatively low temperatures of 200° C. or lower even in the absence of water or an organic solvent. In view of the unique non-volatility of these molten salts, application as an electrolyte of batteries, etc. has been studied. Being liquid, however, they are not easy to handle. In order to facilitate handling of the molten salts, several proposals have been made on a polymer electrolyte having a molten salt immobilized with a polymer.

For example, JP-A-8-245828 discloses a composition comprising an aliphatic quaternary ammonium salt of an organic carboxylic acid and a polymer, such as polyvinyl chloride, polyacrylonitrile or an aliphatic polyether. JP-A-7-118480 discloses a combination of a room-temperature molten salt and a polymer of a vinyl monomer having an alkyl quaternary ammonium salt structure. JP-A-10-83821, JP-A-2000-3620, and JP-A-2000-11753 propose an aliphatic molten salt type polymer synthesized from an imidazolium compound and an acid or an acid monomer. A. Noda, et al., Electrochim Acta, vol. 45, 1265 (2000) and JP-A-11-86632 report a composition of a vinyl polymer and a molten salt. JP-A-10-265673 discloses a polymer composite comprising a non-fluorine polymer and an ionic liquid. Because all these compositions use a polymer the main chain of which is composed mainly of an aliphatic hydrocarbon group, they are inferior in durability characteristics including resistance to oxidation.

JP-A-11-306858 discloses a composition of a vinylidene fluoride polymer and an imidazolium salt, and J. Electrochem. Soc., vol. 147, 34 (2000), Electrochimica Acta, vol. 46, 1703 (2001), and JP-A-11-86632 teach compositions comprising an acid group-containing perfluoropolymer and a molten salt. A composition containing a fluoropolymer is expected to have improved durability but is disadvantageous from the viewpoint of cost and environmental burdens involved in the production of fluoropolymers. It has therefore been demanded to develop an inexpensive and yet durable molten salt composition containing a hydrocarbon polymer.

JP-A-11-86632 proposes a molten salt type polymer electrolyte having a porous polymer solid or a polymer thin film made of a polyanion resin (having negative charges introduced) impregnated with an imidazolium salt derivative. In the practice, however, the proposed technique involves such post-treatments as introduction of a carboxyl group to a porous Teflon membrane using liquid ammonia and sodium or irradiation of a sodium polymethacrylate film with γ-rays to make the film porous. Furthermore, a fluoropolymer has a lower glass transition temperature than room temperature and is therefore unreliable for mechanical strength in high temperature, and an aliphatic polymer can have poor durability against solvents or oxidation. The publication has no mention of the pore size of the porous polymer solid.

JP-A-11-306858 proposes a solid polyelectrolyte composed of a fluoropolymer matrix containing an imidazolium salt and a lithium salt. It is virtually gel and liable to deformation under external pressure, which can pose a strength problem. A fluoropolymer has a lower glass transition temperature than room temperature and is therefore unreliable for mechanical strength in high temperatures.

DISCLOSURE OF THE INVENTION

An object of the present invention is to provide an inexpensive and durable polymer electrolyte membrane which has a clearly defined microporous structure stably holding a molten salt, exhibits excellent mechanical strength, maintains its structure even in high temperatures, and secures high ion conductivity even in the absence of water or a solvent and processes of producing the polymer electrolyte membrane.

The object is accomplished by the following polymer electrolyte membranes and processes of making the same.

A polymer electrolyte membrane having a microporous polymer membrane having pores penetrating through the opposite sides thereof, the microporous polymer membrane containing a mixture of a polymer and a molten salt at a weight ratio of 1/99 to 99/1 and/or a molten salt.

A polymer electrolyte membrane having a microporous polymer membrane having pores penetrating through the opposite sides thereof, the microporous polymer membrane containing a molten salt.

A polymer electrolyte membrane comprising a microporous polymer membrane having pores penetrating through the opposite sides thereof and a mixture of a polymer and a molten salt at a weight ratio of 1/99 to 99/1 held in the pores of the microporous polymer membrane.

A polymer electrolyte membrane comprising a microporous polymer membrane having pores penetrating through the opposite sides thereof and a mixture of a polymer and a molten salt at a weight ratio of 1/99 to 99/1 held in the pores and on both the opposite surfaces of the microporous polymer membrane.

A polymer electrolyte membrane comprising a microporous polymer membrane having pores penetrating through the opposite sides thereof, a molten salt held in the pores, and a layer comprising a mixture of a polymer and a molten salt at a weight ratio of 1/99 to 99/1 provided on both the opposite surfaces of the microporous polymer membrane.

A process of producing a polymer electrolyte membrane containing a molten salt, comprising immersing a microporous polymer membrane having pores penetrating through the opposite sides thereof in a molten salt to infiltrate the molten salt into the pores of the microporous polymer membrane.

A process of producing a polymer electrolyte membrane containing a mixture of a polymer and a molten salt, comprising immersing a microporous polymer membrane having pores penetrating through the opposite sides thereof in a solution of a mixture of a polymer and a molten salt at a weight ratio of 1/99 to 99/1 in a solvent incapable of dissolving the microporous polymer membrane to infiltrate the solution into the microporous polymer membrane, and removing the solvent by drying to have the mixture of the polymer and the molten salt held in the microporous polymer membrane.

A process of producing a polymer electrolyte membrane, comprising immersing a microporous polymer membrane having pores penetrating through the opposite sides thereof in a molten salt to infiltrate the molten salt into the pores of the microporous polymer membrane, applying a solution of a mixture of a polymer and a molten salt at a weight ratio of 1/99 to 99/1 in a solvent incapable of dissolving the microporous polymer membrane to both sides of the microporous polymer membrane, and removing the solvent by drying to form a layer of the mixture of the polymer and the molten salt on both sides of the microporous polymer membrane.

BEST MODE FOR CARRYING OUT THE INVENTION

Figure 1:
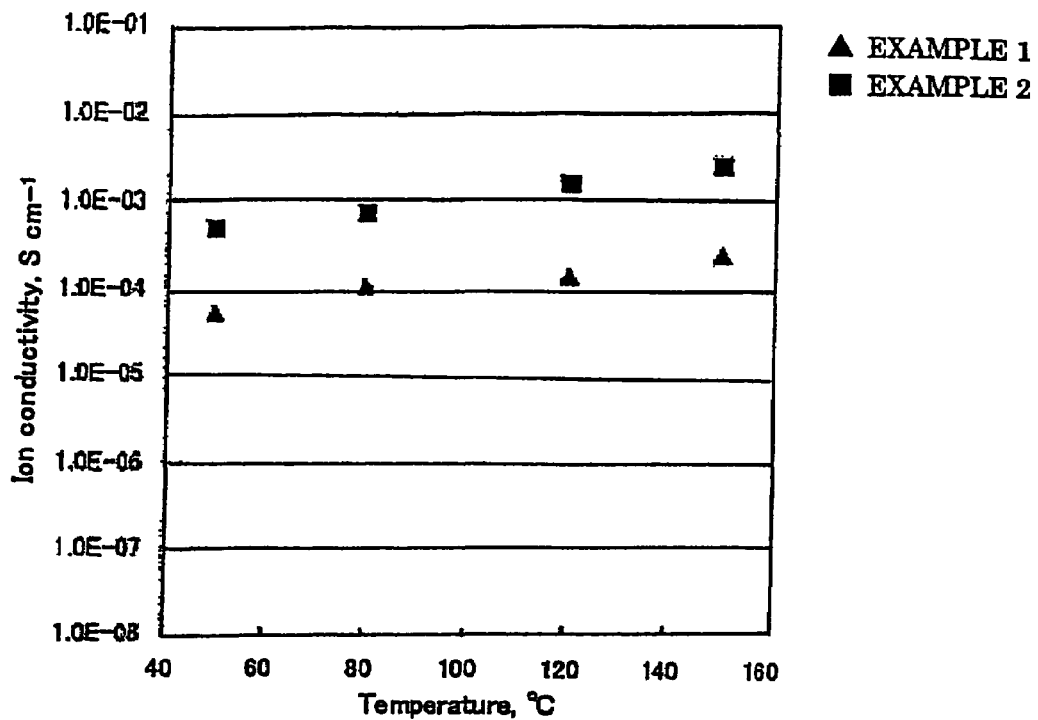
FIG. 1 is a graph showing temperature dependence of ion conductivity of the polymer electrolyte membranes prepared in Examples 1 and 2.

The microporous polymer membrane that can be used in the present invention is not particularly limited as long as it has open pores penetrating through both sides thereof. One which does not dissolve in the molten salt to be held is preferred. When a solvent is used, a microporous polymer membrane which does not dissolve in the solvent is preferred. The pores penetrating through the opposite sides may be either linear or nonlinear.

Useful microporous polymer membranes include those of olefin polymers such as polyethylene and polypropylene, and those of aromatic polymers such as aromatic polyimide, aromatic polyether imide, aromatic polysulfone, aromatic polyether sulfone, polyphenylene oxide, polyphenylene sulfide, aromatic polyether ketone, aromatic polyether ether ketone, aromatic polyether ether ketone ketone, polybenzimidazole, polyquinoxaline, and polyphenylquinoxaline.

Of the polymers making up the microporous polymer membrane those having a low glass transition temperature can have poor mechanical strength in high temperature applications even if they have a high melting point. In order that the microporous structure should have heat resistance and a small coefficient of linear expansion in high-temperature use so as to retain its porous structure, it is preferred to use a microporous polymer membrane made of a heat-resistant polymer that does not have a glass transition temperature below 100° C., still preferably below 120° C., particularly preferably below 150° C.

Microporous polymer membranes made of the above-recited aromatic polymers can be mentioned as preferred examples of those made of such heat-resistant polymers.

Also useful are those made of aromatic heat-resistant polymers of which the glass transition temperatures are so high that thermal decomposition precedes glass transition, which makes glass transition temperature measurement difficult. Such aromatic heat-resistant polymers include those described in Jyunji Furukawa, Sentan Kobunshi Zairyo Series 2 Koseino Hokozokukei Kobunshi Zairyo, Maruzen, Tokyo, 52 (1990), such as poly(p-phenylene), polybenzothiazole, and poly(p-phenylene pyromellitic imide).

The microporous polymer membrane which can be used in the invention can be prepared by known techniques, such as solvent casting, extrusion, melting, and stretching. Commercially available microporous polymer membranes may be utilized.

For example, the microporous polyolefin membrane can be obtained by stretching a polyolefin film, such as a polyethylene film or a polypropylene film, to make the film porous. A commercially available porous polyolefin film may be used as well.

The microporous aromatic polymer membrane made of, for example, an aromatic polyether sulfone can be prepared by a general solvent casting method. Specifically, an aromatic polyether sulfone is dissolved in a water-miscible solvent in a prescribed concentration, casting the solution on a glass plate, immersing the coated glass plate in water to precipitate the polymer, followed by drying to obtain a microporous aromatic polymer membrane. A commercially available one can be used as well. The aromatic polyether sulfone may be synthesized in a known manner, or a commercially available product may be purchased.

For use in the present invention, a microporous polymer membrane made of polyimide is particularly preferred in view of its heat resistance, dimensional stability especially in high temperature, solvent resistance, and thin film mechanical strength.

Microporous polyimide membranes with pores penetrating through both sides thereof are disclosed, e.g., in JP-A-11-310658 and JP-A-2000-306568. They are prepared as follows. A solution is prepared from 0.3 to 60% by weight of a polyimide precursor and 40 to 99.7% by weight of a solvent. The solution is cast in the form of film. In order to regulate the rate of solvent exchange, a porous film of a polyolefin, etc. is superposed on the cast film. The resulting laminate is brought into contact with a solidifying solvent, thereby precipitating the polyimide precursor while forming fine pores. The porous polyimide precursor membrane is then converted to the corresponding microporous polyimide membrane with fine penetrating pores by thermal or chemical imidization process.

The polyimide precursor is a polyamic acid or a partially imidized polyamic acid obtained by polymerizing monomers as a tetracarboxylic acid component and a diamine component, preferably monomers belonging to aromatic compounds. The polyimide precursor cyclizes on heat treatment or chemical treatment to become a polyimide resin. The term "polyimide resin" as used herein means a heat-resistant polymer having a degree of imidization of about 50% or more.

The solvent of the polyimide precursor solution includes p-chlorophenol, N-methyl-2-pyrrolidone (NMP), pyridine, N,N-dimethylacetamide, N,N-dimethylformamide, dimethyl sulfoxide, tetramethylurea, phenol, and cresol.

The polyimide precursor is obtained by dissolving approximately equimolar amounts of a tetracarboxylic acid component and a diamine component in the same organic solvent as used to dissolve the resulting polyimide precursor and polymerizing them. The polyimide precursor preferably has an inherent viscosity of 0.3 or greater, still preferably 0.5 to 7 (at 30° C.; at a concentration of 0.5 g in 100 ml NMP). When the polymerization is carried out at or above about 80° C., the polyimide precursor imidized partially by cyclization is obtained.

The diamine component includes p-phenylenediamine, m-phenylenediamine, 4,4'-diaminodiphenyl ether, 3,3'-dimethyl-4,4'-diaminodiphenyl ether, 3,3'-diethoxy-4,4'-diaminodiphenyl ether, and 3,3'-dihydroxy-4,4'-diaminobiphenyl.

Also included are diaminopyridine compounds, e.g., 2,6-diaminopyridine, 3,6-diaminopyridine, 2,5-diaminopyridine, and 3,4-diaminopyridine. These diamine components can be used either individually or as a mixture of two or more thereof. It is preferred that 3,3'-dihydroxy-4,4'-diaminobiphenyl be used in a proportion of at least 1 mol % based on the total diamine component. To use 1 mol % or more of 3,3'-dihydroxy-4,4'-diaminobiphenyl is effective in producing a microporous polymer membrane easy to impregnate with a polymer/molten salt mixture.

The tetracarboxylic acid component preferably includes 3,3',4,4'-biphenyltetracarboxylic acid dianhydride and 2,3,3',4'-biphenyltetracarboxylic acid dianhydride. Also useful are 2,3,3',4'- or 3,3',4,4'-biphenyltetracarboxylic acid and a salt or ester derivative of 2,3,3',4'- or 3,3',4,4'-biphenyltetracarboxylic acid. These biphenyltetracarboxylic acid compounds can be used as a mixture of two or more thereof.

The tetracarboxylic acid component may contain up to 10 mol %, preferably up to 5 mol %, based on the total tetracarboxylic acid component, of other tetracarboxylic acid compounds than the above-described biphenyltetracarboxylic acid compounds, such as pyromellitic acid, 3,3',4,4'-benzophenonetetracarboxylic acid, 2,2-bis(3,4-dicarboxyphenyl)propane, bis(3,4-dicarboxyphenyl) sulfone, bis(3,4-dicarboxyphenyl) ether, bis(3,4-dicarboxyphenyl) thioether, butanetetracarboxylic acid, and an anhydride, salt or ester derivative of these acids.

The microporous polymer membrane that can be used in the invention preferably has an average pore size of 0.01 to 50 μm, still preferably 0.05 to 10 μm. A membrane whose average pore size is too small is difficult to impregnate with a polymer/molten salt mixture or a molten salt. A membrane whose average pore size is too large is inferior in mechanical strength and incapable of stably holding a polymer/molten salt mixture or a molten salt.

The microporous polymer membrane that can be used in the invention preferably has a void of 10 to 90% by volume, still preferably 20 to 80% by volume. With too small a void volume, the amount of a polymer/molten salt mixture or a molten salt that can be held is reduced, resulting in reduced ion conductivity. A membrane whose void is too large is inferior in mechanical strength and incapable of stably holding a polymer/molten salt mixture or a molten salt.

The microporous polymer membrane that can be used in the invention preferably has a linear expansion coefficient of 0.5 to $10 \times 10^{-5}/°C$. and an air resistance (Gurley) porosity of 10 to 1000 sec/100 cc. The membrane thickness is selected according to the intended use. For example, the thickness is suitably 10 to 50 μm for lithium battery application and 10 to 250 μm for fuel cell application.

The polymer of the polymer/molten salt mixture that is held in the microporous polymer membrane is not particularly limited as long as it can be held together with a molten salt. Useful polymers include vinyl polymers, such as polymers having an aliphatic main chain, including acrylic or methacrylic ester polymers, e.g., poly(methyl acrylate), poly(ethyl acrylate), poly(methyl methacrylate), and poly(ethyl methacrylate); halogen-containing polymers, e.g., polyvinyl chloride and polyvinylidene fluoride; styrene polymers, e.g., polystyrene and poly(α-methylstyrene); polyacrylonitrile; and polyvinyl acetate. Also included are aromatic polymers, such as aromatic polyether sulfone, aromatic polysulfone, aromatic polyether ketone, aromatic polyether ether ketone, aromatic polyether ketone ketone, aromatic polyimide, and polyphenylene oxide.

The polymer preferably is cation exchange group-containg polymer. Preferred cation exchange groups include a sulfonic group, a carboxyl group, and a phosphonic group.

Such cation exchange group-containing polymers include cation exchange group-containing styrene polymers, such as poly(styrenesulfonic acid), poly(vinylbenzylsulfonic acid), a sulfo-containing styrene-(ethylene-butylene)-styrene triblock copolymer and a sulfo-containing styrene-(ethylene-propylene) block copolymer that are described in JP-T-2002-509152 and European Polymer Journal, vol. 36, 61 (2001), a carboxyl-containing styrene-(ethylene-butylene)-styrene triblock copolymer and a carboxyl-containing styrene-(ethylene-propylene) block copolymer that are described in Macromolecules, vol. 28, 8702 (1995) and European Polymer Journal, Vol. 36, 61 (2001), and phosphonic-containing polystyrene described in JP-A-2000-11755; and cation exchange group-containing polymers, such as polyacrylic acid, polymethacrylic acid, and polyvinylsulfonic acid, and sulfo- or carboxyl-containing perfluoropolymers, such as Nafion®, Aciplex®, and Flemion®, have an aliphatic main chain Also included are aromatic polymers, such as aromatic polyether sulfone, aromatic polysulfone, aromatic polyether ketone, aromatic polyether ether ketone, aromatic polyether ketone ketone, aromatic polyimide, and polyphenylene oxide, which contain cation exchange groups. Examples are sulfo-containing aromatic polyether sulfone described in JP-A-61-43630, J. Membr. Sci., vol. 83, 211 (1993), J. Polym. Sci., Part A, Polym. Chem., vol. 34, 2421 (1996), J. Polym. Sci., Part A, Polym. Chem., vol. 31, 853 (1993), and U.S. Patent Publication 20010021764A1; carboxyl-containing aromatic polyether sulfone described in Polymer, vol. 27, 1626 (1986), Polymer, vol. 42, 5973 (2001), and Polymer, vol. 34, 2836 (1993); sulfo-containing aromatic polyether ketone described in JP-A-57-25328, JP-A-57-25328, JP-A-6-93114, J. Membr. Sci., vol. 199, 167 (2002), J. Membr. Sci., vol. 173, 17 (2000), Polymer, vol. 28, 1009 (1987), Solid State Ionics, vol. 106, 219 (1998), Br. Polym. J., vol. 17, 4 (1985), and Polym. Int., vol. 50, 812 (2001); carboxyl-containing aromatic polyether ketone described in Macromolecules, vol. 26, 5295 (1993); sulfo-containing polyimide described in Kobunshi Gakkai Yokosyu (Polymer Preprints, Japan), vol. 51, 744-746 (2002); and sulfo-containing polyphenylene oxide described in J. Appl. Polymer. Sci., vol. 51, 1399 (1994), J. Appl. Polym. Sci., vol. 29, 4017 (1984), J. Appl. Polym. Sci., vol. 29, 4029 (1984), and J. Membr. Sci., vol. 146, 263 (1998).

The polymer may be a copolymer, which may be a random, block or graft copolymer.

The cation exchange group-containing polymer preferably has an ion exchange capacity of 0.3 to 7 meq/g, still preferably 0.5 to 7 meq/g. Where the ion exchange capacity is less than that lower limit, the polymer tends to fail to retain a molten salt, allowing the molten salt to bleed out.

The molten salt of the polymer/molten salt mixture that is held in the microporous polymer membrane preferably has a melting point of 100° C. or lower, still preferably 80° C. or lower, particularly preferably 60° C. or lower. Known molten salts can be used. The molten salt is composed of cation components and anion components. Preferred molten salts include those that are liquid at room temperature, room-temperature molten salts, and ionic liquids.

The cation component composing the molten salt is preferably an ammonium ion in view of molten salt's stability and the like. Cations having the following structures can be mentioned as examples.

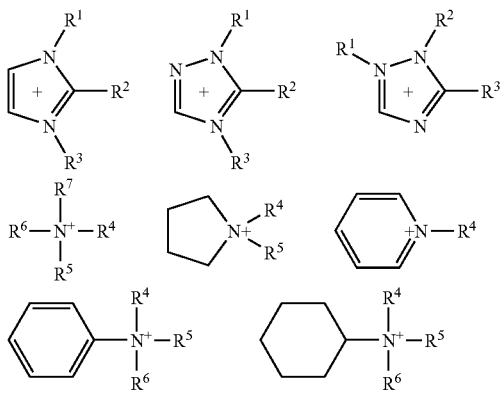

wherein $R^1$, $R^2$, $R^3$, $R^4$, $R^5$, $R^6$ and $R^7$ each represent a hydrogen atom or an alkyl group having 1 to 10 carbon atoms; and the rings may have substituents other than hydrogen atoms on their ring-forming carbon atoms.

Cations having a cyclic structure preferably include those having an imidazole ring, a triazole ring, a pyrrolidine ring, a pyridine ring, a cyclohexane ring or a benzene ring. Each of these rings may be substituted. Cations having a straight-chain or branched alkyl group preferably include those having an alkyl group containing 1 to 10 carbon atoms, e.g., methyl, ethyl, propyl, isopropyl, n-butyl, isobutyl, sec-butyl, tert-butyl, pentyl or hexyl. Preferred of the above cations are an imidazolium cation, a triazolium cation, a tetraalkylammonium cation, a pyrrolidinium cation, and pyridinium cation.

The anion component composing the molten salt preferably includes sulfonic acid, a sulfonic acid compound, a carboxylic acid, and an inorganic acid. Specific examples are $(CF_3SO_2)_3C^-$, $(CF_3SO_2)_2N^-$, $CF_3SO_3^-$, $C_4F_9SO_3^-$, $CF_3CO_2^-$, $C_3F_7CO_2^-$, $BF_4^-$, $PF_6^-$, $ClO_4^-$, $CH_3SO_3^-$, $CH_3CO_2^-$, $NO_3^-$, $NO_2^-$, $HSO_3^-$, and halide ions.

Methods for synthesizing molten salts composed of the anion and cation components are known. For example, the molten salts are synthesized by the methods described in Hiroyuki Ohno, Lithium Nijidenchino Gijyutukakushinto Syoraitenbo, NTS Inc., Tokyo, p. 79 (2001), R. Hagiwara et al., J. Fluorine Chem., vol. 105, 221 (2000), J. Sun et al., Electrochimica Acta., vol. 46, 1703 (2001), P. Bonhote et al., Inorg. Chem., vol. 35, 1168 (1996), and D. R. McFarlane et al., Electrochim. Acta., vol. 45, 1271 (2000).

More specifically, the molten salts are obtained by the reaction between a basic nitrogen-containing compound and/or a halogen salt thereof and an acid and/or a metal salt thereof.

Examples of preferred molten salts are listed below.

Trifluoromethanesulfonates, including 1,3-dimethylimidazolium trifluoromethanesulfonate, 1,3-diethylimidazolium trifluoromethanesulfonate, 1,2-dimethylimidazolium trifluoromethanesulfonate, 1,2-diethylimidazolium trifluoromethanesulfonate, 1-ethyl-3-methylimidazolium trifluoromethanesulfonate, 1-methyl-3-propylimidazolium trifluoromethanesulfonate, 2-ethyl-1-methylimidazolium trifluoromethanesulfonate, 1-ethyl-2-methylimidazolium trifluoromethanesulfonate, 1,2,3-trimethylimidazolium trifluoromethanesulfonate, 1,2-dimethyl-3-propylimidazolium trifluoromethanesulfonate, 1-methylimidazolium trifluoromethanesulfonate, 1-ethylimidazolium trifluoromethanesulfonate, 1-vinylimidazolium trifluoromethanesulfonate, and 2-methylimidazolium trifluoromethanesulfonate.

Trifluoroacetates, such as 1,3-dimethylimidazolium trifluoroacetate and 1-ethyl-3-methylimidazolium trifluoroacetate.

Tetrafluoroborates, such as 1,3-dimethylimidazolium tetrafluoroborate, 1,3-diethylimidazolium tetrafluoroborate, 1,2-dimethylimidazolium tetrafluoroborate, 1,2-diethylimidazolium tetrafluoroborate, 1-ethyl-3-methylimidazolium tetrafluoroborate, 1-methyl-3-propylimidazolium tetrafluoroborate, 2-ethyl-1-methylimidazolium tetrafluoroborate, 1-ethyl-2-methylimidazolium tetrafluoroborate, 1,2,3-trimethylimidazolium tetrafluoroborate, 1,2-dimethyl-3-propylimidazolium tetrafluoroborate, 1-methylimidazolium tetrafluoroborate, 1-ethylimidazolium tetrafluoroborate, 1-vinylimidazolium tetrafluoroborate, 2-methylimidazolium tetrafluoroborate, and 1-butylpyridinium tetrafluoroborate.

Hexafluorophosphates, such as 1,3-dimethylimidazolium hexafluorophosphate and 1-butyl-3-methylimidazolium hexafluorophosphate.

Tris(trifluoromethylsulfonyl)methides, such as 1,3-dimethylimidazolium tris(trifluoromethylsulfonyl)methide, 1,3-diethylimidazolium tris(trifluoromethylsulfonyl)methide, 1,2-dimethylimidazolium tris(trifluoromethylsulfonyl)methide, 1,2-diethylimidazolium tris(trifluoromethylsulfonyl)methide, 1-ethyl-3-methylimidazolium tris(trifluoromethylsulfonyl)methide, 1-methyl-3-propylimidazolium tris(trifluoromethylsulfonyl)methide, 2-ethyl-1-methylimidazolium tris(trifluoromethylsulfonyl)methide, 1-ethyl-2-methylimidazolium tris(trifluoromethylsulfonyl)methide, 1,2,3-trimethylimidazolium tris(trifluoromethylsulfonyl)methide, 1,2-dimethyl-3-propylimidazolium tris(trifluoromethylsulfonyl)methide, 1-methylimidazolium tris(trifluoromethylsulfonyl)methide, and 2-methylimidazolium tris(trifluoromethylsulfonyl)methide.

Methanesulfonates, such as 1,3-dimethylimidazolium methanesulfonate, 1-methylimidazolium methanesulfonate, 1-ethylimidazolium methanesulfonate, and 1-vinylimidazolium methanesulfonate.

Acetates, such as 1,3-dimethylimidazolium acetate, 1-ethyl-3-methylimidazolium acetate, 1-methylimidazolium acetate, and 1-ethylimidazolium acetate.

Nitrates, such as 1,3-dimethylimidazolium nitrate, 1-ethyl-3-methylimidazolium nitrate, 1-methylimidazolium nitrate, 1-ethylimidazolium nitrate, and 1-vinylimidazolium nitrate.

Nitrites, such as 1,3-dimethylimidazolium nitrite and 1-ethyl-3-methylimidazolium nitrite.

Sulfites, such as 1,3-dimethylimidazolium sulfite, 1-methylimidazolium sulfite, 1-ethylimidazolium sulfite, and 1-vinylimidazolium sulfite.

Chlorides, such as 1,3-dimethylimidazolium chloride, 1-ethyl-3-methylimidazolium chloride, 1-methylimidazolium chloride, 1-ethylimidazolium chloride, 1-vinylimidazolium chloride, 1,2-dimethyl-1,2,4-triazolium chloride, and 1-butylpyridinium chloride.

Bromides, such as 1,3-dimethylimidazolium bromide, 1-ethyl-3-methylimidazolium bromide, 1-methylimidazolium bromide, 1-ethylimidazolium bromide, 1-vinylimidazolium bromide, and 1-butylpyridinium bromide.

Bis(trifluoromethylsulfonyl)imides, such as 1,3-dimethylimidazolium bis(trifluoromethylsulfonyl)imide, 1,3-diethylimidazolium bis(trifluoromethylsulfonyl)imide, 1,2-dimethylimidazolium bis(trifluoromethylsulfonyl)imide, 1,2-diethylimidazolium bis(trifluoromethylsulfonyl)imide, 1-ethyl-3-methylimidazolium bis(trifluoromethylsulfonyl)imide, 1-methyl-3-propylimidazolium bis(trifluoromethylsulfonyl)imide, 2-ethyl-1-methylimidazolium bis(trifluoromethylsulfonyl)imide, 1-ethyl-2-methylimidazolium bis(trifluoromethylsulfonyl)imide, 1,2,3-trimethylimidazolium bis(trifluoromethylsulfonyl)imide, 1,2-dimethyl-3-propylimidazolium bis(trifluoromethylsulfonyl)imide, 1-methylimidazolium bis(trifluoromethylsulfonyl)imide, 1-ethylimidazolium bis(trifluoromethylsulfonyl)imide, 1-vinylimidazolium bis(trifluoromethylsulfonyl)imide, and 2-methylimidazolium bis(trifluoromethylsulfonyl)imide.

Of these molten salts, imidazolium salts are preferred for their low viscosity at room temperature. Too viscous molten salts are difficult to hold in the microporous polymer membrane. Specifically, 1-ethyl-3-methylimidazolium trifluoromethanesulfonate, 1-ethyl-3-methylimidazolium tetrafluoroborate, 1-ethyl-3-methylimidazolium bis(trifluoromethylsulfonyl)imide, 1-ethyl-3-methylimidazolium acetate, 1-ethylimidazolium trifluoromethanesulfonate, 1-ethylimidazolium tetrafluoroborate, 1-ethylimidazolium nitrate, 1-ethylimidazolium bis(trifluoromethylsulfonyl)imide, and the like are preferred.

The polymer and molten salt mixture to be held in the microporous polymer membrane has a polymer/molten salt weight ratio of 1/99 to 99/1, preferably 5/95 to 95/5. If the proportion of the molten salt is lower than that lower limit, the ion conductivity is unfavorably small. If it exceeds the upper limit, the molten salt cannot be held stably.

The content of the polymer/molten salt mixture is preferably 1 to 99% by weight, still preferably 5 to 95% by weight. That content is calculated using the following equation, in which $W_1$ is the weight of a microporous polymer membrane, and $W_2$ is the weight of a polymer electrolyte membrane, i.e., the weight of the microporous polymer membrane containing a polymer/molten salt mixture.

The content of the mixture (wt %)=$(W_2-W_1)/W_2 \times 100$

When the content of the mixture is smaller than that lower limit, the ion conductivity is reduced. When the content is larger than that upper limit, the effect of using a microporous polymer membrane on structure retention is small.

Where a molten salt alone is held in the microporous polymer membrane, the same molten salts as used in the polymer/molten salt mixture can be used.

When only a molten salt is held in the porous polymer membrane, the molten salt content is preferably 1 to 90% by volume, still preferably 5 to 90% by volume. The molten salt content can be calculated using the following equation, where S and d mean the area and the thickness, respectively, of a microporous polymer membrane; and a and b represent the weight and the density, respectively, of an impregnating molten salt.

Molten salt content (vol %)=$a/(S \times d \times b) \times 100$

When the molten salt content is smaller than that lower limit, the ion conductivity is small.

The polymer electrolyte membrane according to the invention, in which the microporous polymer membrane with penetrating pores contains the polymer/molten salt mixture and/or the molten salt, preferably includes the following embodiments.

A polymer electrolyte membrane having the molten salt held in the pores of the microporous polymer membrane.

A polymer electrolyte membrane having the polymer/molten salt mixture held in the pores of the microporous polymer membrane.

A polymer electrolyte membrane having the polymer/molten salt mixture held in the pores and on both surfaces of the microporous polymer membrane.

A polymer electrolyte membrane having the molten salt held in the pores of the microporous polymer membrane and having a layer comprising the polymer/molten salt mixture formed on both surfaces of the microporous polymer membrane.

The polymer electrolyte membrane containing a molten salt can be produced by immersing the microporous polymer membrane in a molten salt. The molten salt is thus allowed to fill the pores of the microporous polymer membrane and retained therein. If necessary, the molten salt is allowed to infiltrate under vacuum degassing and/or pressurizing to accelerate displacement of gas in the pores of the microporous polymer membrane with the molten salt and filling the pores of the microporous polymer membrane with the molten salt.

If desired, the impregnating molten salt may be in the form of a solution in a solvent incapable of dissolving the microporous polymer membrane. In this case, the impregnated polymer membrane is dried by heating to remove the solvent.

The solvent used to prepare the molten salt solution is not particularly limited provided that the microporous polymer membrane does not substantially dissolve therein, including amides, sulfones, alcohols, ethers, and ketones. Examples of suitable solvents are water, N,N-dimethylformamide, N,N-dimethylacetamide, N-methyl-2-pyrrolidone, 1,3-dimethyl-2-imidazolidinone, dimethyl sulfoxide, sulfolane, diphenyl sulfone, tetrahydrofuran, methanol, ethanol, isopropyl alcohol, ethylene glycol monomethyl ether, ethylene glycol monoethyl ether, propylene glycol monomethyl ether, diethyl ether, and acetone.

The temperature of the molten salt or the molten salt solution to be infiltrated into the microporous polymer membrane is not particularly limited as long as it is within a range of from the melting point of the molten salt and/or the melting point of the solvent to the boiling point of the solvent and also not higher than the melting or decomposition temperature of the microporous polymer membrane and not higher than the decomposition temperature of the molten salt. It is carried out at, for example, a temperature of 0° to 300° C.

The polymer electrolyte membrane containing a mixture of a polymer and a molten salt can be produced by immersing the microporous polymer membrane in a solution of the polymer/molten salt mixture in a solvent incapable of dissolving the microporous polymer membrane to allow the solution to impregnate the microporous polymer membrane and removing the solvent by drying. If necessary, the mixture solution is allowed to infiltrate with vacuum degassing and/or pressurizing to accelerate displacement of gas in the pores of the microporous polymer membrane with the solution and filling the pores of the microporous polymer membrane with the solution.

The solvent for dissolving the polymer/molten salt mixture can be chosen with no limitation from among those useful in the preparation of the molten salt solution, provided that the microporous polymer membrane does not substantially dissolve therein.

The temperature of the polymer/molten salt solution to be infiltrated into the microporous polymer membrane is not particularly limited as long as it is within a range of from the melting points of the molten salt and the solvent to the boiling point of the solvent and also not higher than the melting or decomposition temperature of the microporous polymer membrane and not higher than the decomposition temperature of the molten salt. The impregnation is carried out at, for example, a temperature of 0° to 300° C.

The polymer electrolyte membrane containing a molten salt in the pores of the microporous polymer membrane and having a layer of a polymer/molten salt mixture provided on both sides of the microporous polymer membrane can be produced by immersing the microporous polymer membrane in the molten salt to infiltrate the molten salt into the pores of the microporous polymer membrane, applying a solution of the polymer/molten salt mixture in a solvent incapable of dissolving the microporous polymer membrane to both sides of the microporous polymer membrane, and removing the solvent by drying to form a layer of the polymer/molten salt mixture on both sides of the microporous polymer membrane. If desired, the molten salt is allowed to infiltrate with vacuum degassing and/or pressurizing to accelerate displacement of gas in the pores of the microporous polymer membrane with the molten salt and filling the pores of the microporous polymer membrane with the molten salt.

Furthermore, the impregnating molten salt may be in the form of a solution in a solvent incapable of dissolving the microporous polymer membrane. In this case, the impregnated polymer membrane is dried by heating to remove the solvent.

The solvent used to prepare the molten salt solution and the polymer/molten salt mixture solution can be chosen with no limitation from among those useful in the preparation of the molten salt solution used in the production of the polymer electrolyte membrane containing the molten salt, provided that the solvent does not substantially dissolve the microporous polymer membrane.

The temperature of impregnating the microporous polymer membrane with the molten salt and the temperature of applying the polymer/molten salt mixture solution to the microporous polymer membrane are not particularly limited as long as they are within a range of from the melting points of the molten salt and the solvent to the boiling point of the solvent and also not higher than the melting or decomposition temperature of the microporous polymer membrane or not higher than the decomposition temperature of the molten salt. The impregnation and application are carried out at, for example, a temperature of 0° to 300° C.

In the production of the polymer electrolyte membrane of the present invention, a surface active agent can be used for the purpose of facilitating penetration of the molten salt and the polymer/molten salt mixture solution into the microporous polymer membrane. If desired, the polymer electrolyte membrane can further contain an inorganic acid (e.g., phosphoric acid, hypophosphorous acid or sulfuric acid) or a salt thereof, a perfluoroalkylsulfonic acid having 1 to 14 carbon atoms or a salt thereof, a perfluoroalkylcarboxylic acid having 1 to 14 carbon atoms or a salt thereof, a tertiary amine compound (e.g., imidazole, pyridine or an aliphatic tertiary amine), or a salt of an alkali metal (e.g., lithium).

According to the present invention, a polymer electrolyte membrane having an ion conductivity of, for example, $10^{-4}$ Scm$^{-1}$ or higher at 100° C. can appropriately be obtained.

The effects of the present invention will be demonstrated by way of Examples and Comparative Examples. In Examples and Comparative Examples, measurements were made in accordance with the following methods.

1) Ion Conductivity

A membrane having been vacuum dried at 60° C. for 16 hours was sandwiched between stainless steel plates having a radius of 0.65 cm and put into a closed container. The ionic conductivity was obtained by complex impedance measurement with FRD 1025 and Potentiostat/Galvanostat 283 supplied by Princeton Applied Research in a thermostat set at a prescribed temperature.

2) Melting Point

Measured with DSC-7 supplied from Perkin-Elmer Inc. at a rate of temperature rise of 10°/min in a helium stream.

3) Thickness

Measured with a contact thickness gauge.

4) A Percentage of Void

A predetermined size of a piece was cut out of a microporous polymer membrane, and the thickness and weight of the cut piece were measured. A percentage of void was obtained from the basis weight according to the following equation. In equation, S is the area of the microporous polymer membrane; d is the membrane thickness; w is the weight measured; and D is the density of polyimide. The polyimide used had a density of 1.34.

A percentage of void (%)=[1−$w/(S{\times}d{\times}D)$]×100

5) Average Pore Size

Pore sizes within a range of 3.4 nm to 400 µm were measured by mercury intrusion porosimetry with Autoscan Prosimeter 60+500 from Yuasa Ionics Co., Ltd. An average of measured values in a range of 3.4 nm to 1 µm was obtained.

6) Linear Expansion Coefficient

Measured with TMA-50 from Shimadzu Corp. during temperature rise at a rate of 20° C./min from 50° to 200° C. in a nitrogen atmosphere.

7) Tg

Calculated from the temperature variance profile of dynamic viscoelasticity and loss tangent measured with RSA II supplied from Rheometric Scientific FE Ltd. while a sample was heated at a rate of 3° C./min from −50° to 500° C. in a tensile mode at a frequency of 5 Hz with a 0.1% strain.

8) $\eta_{sp/c}$ (Solution Viscosity)

Measurement was made on a 0.5 g/dl polymer solution in N-methyl-2-pyrrolidone at 25° C. with a Ubbellohde viscometer. The solution viscosity was calculated according to equation (1):

$$\eta_{sp/c} = \frac{t_s - t_0}{t_0} \cdot \frac{1}{c} \tag{1}$$

wherein $t_s$ is a solution flow time; $t_0$ is a solvent flow time; and c is a solution concentration.

9) Ion Exchange Capacity

A sample was stirred in a 0.01N sodium hydroxide aqueous solution at room temperature for 16 hours, followed by filtration. The filtrate was titrated with a 0.01N hydrochloric acid aqueous solution to determine the amount of consumed sodium hydroxide, from which the ion exchange capacity was calculated.

10) Transmission Electron Microscopic Observation

A film was sliced in the thickness direction, and the slice was observed under JEM 200CX supplied from JEOL Ltd. at a magnification of 90000 times.

SYNTHESIS EXAMPLE 1

In a four-necked separable flask equipped with a stirrer, a nitrogen inlet tube, and a gas outlet tube were put N,N- dimethylacetamide as a solvent and 4,4'-diaminodiphenyl ether as a diamine component. The mixture was stirred at 40° C. in a nitrogen atmosphere to make a solution. To the solution was added an equimolar amount, based on the diamine component, of 3,3',4,4'-biphenyltetracarboxylic acid dianhydride in several divided portions. The mixture was allowed to react at 40° C. for about 12 hours while stirring to obtain a viscous polyamic acid solution having a solid content of 9.1 wt %. The resulting solution was cast on a mirror-finished SUS plate. A microporous polyolefin film (UP-3025, available from Ube Industries, Ltd.) was superposed on the polyamic acid solution cast film as a solvent exchange rate regulatory material. The laminated film structure was immersed in methanol and then in water to obtain a polyamic acid microporous membrane. The membrane was fixed on a pin tenter and heated in the atmosphere at 320° C. to obtain microporous polyimide membrane PI-1. The resulting membrane had the following characteristics.

Tg: 275° C.
Average pore size: 0.18 μm.
Void: 35%
Air resistance (Gurley): 150 sec/100 cc
Thickness: 31 μm
Linear expansion coefficient: $3.830 \times 10^{-5}$/° C.

SYNTHESIS EXAMPLE 2

In a four-necked separable flask equipped with a stirrer, a nitrogen inlet tube, and a gas outlet tube were put N,N-dimethylacetamide as a solvent and, as diamine components, 4,4'-diaminodiphenyl ether and 3,3'-dihydroxy-4,4'-diaminobiphenyl at a molar ratio of 6/4. The mixture was stirred at 40° C. in a nitrogen atmosphere to make a solution. To the solution was added an equimolar amount, based on the total diamine component, of 3,3',4,4'-biphenyltetracarboxylic acid dianhydride in several divided portions. The mixture was allowed to react at 40° C. for about 12 hours while stirring to obtain a viscous polyamic acid solution having a solid content of 9.0 wt %. The resulting solution was cast on a mirror-finished SUS plate. A microporous polyolefin film (UP-3025, available from Ube Industries, Ltd.) was superposed on the polyamic acid solution cast film as a solvent exchange rate regulatory material. The laminated film structure was immersed in methanol and then in water to obtain a microporous polyamic acid membrane. The membrane was fixed on a pin tenter, and heated in the atmosphere at 320° C. to obtain microporous polyimide membrane PI-2 having the following characteristics.

Tg: 290° C.
Average pore size: 0.12 μm.
Void: 68%
Air resistance (Gurley): 66 sec/100 cc
Thickness: 76 μm
Linear expansion coefficient: $4.634 \times 10^{-5}$/° C.

SYNTHESIS EXAMPLE 3

To a solution of 16 g of N-ethylimidazole in 20 ml of ethanol was added dropwise 25 g of trifluoromethanesulfonic acid at 0° C. After returning to room temperature, the solution was stirred overnight and dried in vacuo at 60° C. for 16 hours to give N-ethylimidazolium trifluoromethanesulfonate (hereinafter referred to as EtIm+TfS−) as a colorless transparent liquid. The melting point of the resulting salt (literature value: 7.8° C.,) was measured by DSC analysis. As a result, endothermic peaks were observed at 6.3° C. and 21.0° C.

SYNTHESIS EXAMPLE 4

In a reactor were put 51.4 g of bis(4-fluorophenyl) sulfone, 25 g of bis(4-hydroxyphenyl) sulfone, 18.9 g of 4,4'-biphenol, and 36 g of potassium carbonate. To the mixture were added 300 m of N,N-dimethylacetamide and 200 ml of toluene, followed by heating while stirring in a nitrogen stream. The temperature was elevated up to 165° C. while removing produced water together with toluene. The stirring was continued for 3 hours at that temperature. The solution was poured into a large quantity of water to precipitate a while solid, which was collected by filtration, washed twice with hot water and once with methanol, and dried under reduced pressure to obtain a copolymer. The solution viscosity $\theta_{sp/c}$ of the resulting copolymer was 0.55.

Ten grams of the resulting copolymer was dissolved in 100 ml of 98% sulfuric acid, and the solution was stirred at room temperature for 24 hours. The solution was poured into a large amount of water. The precipitated white solid was separated by filtration, washed twice with hot water and once with methanol, and dried under reduced pressure to give a sulfo-containing polyether sulfone. The resulting polymer had an ion exchange capacity of 1.73 mmol/g. A solution of the polymer in N,N-dimethylacetamide was cast and dried to form a membrane. TEM observation of the membrane revealed no phase separation structure, proving the polymer to be a random copolymer.

SYNTHESIS EXAMPLE 5

In 100 ml of 98% sulfuric acid was dissolved 10 g of a commercially available poly(oxy-1,4-phenyleneoxy-1,4-phenylenecarbonyl-1,4-phenylene) (weight average molecular weight: ca. 20,800; number average molecular weight: 10,300; melting point: 322° C.). The solution was stirred at room temperature for 45 hours and then poured into a large amount of water to precipitate a white solid. The solid was separated by filtration, washed with a large quantity of water until the washing became neutral, and dried under reduced pressure to give a sulfo-containing polyether ether ketone. The resulting polymer had an ion exchange capacity of 1.54 mmol/g.

SYNTHESIS EXAMPLE 6

In a four-necked flask equipped with a stirrer, a water content meter, a thermometer, and a nitrogen inlet tube were put 51.4 g of bis(4-fluorophenyl) sulfone, 50 g of bis(4-hydroxyphenyl) sulfone, and 36 g of potassium carbonate. Then, 300 ml of N,N-dimethylacetamide and 200 ml of toluene were added thereto, followed by heating while stirring in a nitrogen stream. The temperature was elevated up to 165° C. while removing produced water together with toluene. The stirring was continued for 3 hours at that temperature. The solution was poured into a large quantity of water to precipitate a white solid, which was collected by filtration. The solid was washed twice with hot water and then once with methanol and dried under reduced pressure to give hydrophobic segment prepolymer (a). The resulting polymer (a) had a solution viscosity $\eta_{sp/c}$ of 0.42.

To a mixture of 25.7 g of bis(4-fluorophenyl) sulfone, 18.9 g of 4,4'-biphenol, and 18 g of potassium carbonate were added 150 ml of N,N-dimethylacetamide and 100 ml of toluene. The mixture was heated with stirring in a nitrogen stream up to 165° C. while removing produced water together with toluene. The stirring was continued at that temperature for 3 hours to prepare a polymer (b) solution. Separately, 42.6 g of hydrophobic segment prepolymer (a) and 0.5 g of potassium carbonate were added to a mixture of 150 ml of N,N-dimethylacetamide and 100 ml of toluene, and the mixture was heated in a nitrogen stream up to 165° C. while removing produced water together with toluene to prepare a solution of a potassium salt of polymer (a). The resulting solution of the hydrophobic segment prepolymer (a) potassium salt was added to the polymer (b) solution, and the mixture was stirred at 160° C. for 1 hour. The mixed solution was poured into a large amount of water to precipitate a white solid. The solid was collected by filtration, washed twice with hot water and once with methanol, and dried in vacuo to obtain a copolymer. The resulting copolymer had a solution viscosity $\eta_{sp/c}$ of 0.63.

Ten grams of the resulting copolymer was dissolved in 100 ml of 98% sulfuric acid. The solution was stirred at room temperature for 24 hours, followed by pouring into a large quantity of water. The white solid thus precipitated was separated by filtration, washed twice with hot water and once with methanol, and vacuum dried to yield sulfo-containing polyether sulfone. The resulting polymer had a reduced viscosity of 0.42 dl/g and an ion exchange capacity of 1.78 mmol/g. The hydrophilic segment weight fraction was 0.49 as calculated by $^1$H-NMR analysis. A membrane prepared by casting a solution of the sulfo-containing polyether sulfone in N,N-dimethylacetamide and drying revealed a phase separation structure under TEM observation, proving that the polymer to be a block copolymer.

EXAMPLE 1

A disk-shaped specimen having a diameter of 13 mm was cut out of the microporous polyimide membrane PI-1 prepared in Synthesis Example 1. The specimen of the microporous polyimide membrane was impregnated with EtIm+TfS− obtained in Synthesis Example 3 by vacuum suction. The vacuum suction was ended while both sides of the specimen were wet. The excess EtIm+TfS− was wiped off both sides with waxed paper. After the impregnation operation, the specimen became deeper in hue, indicating that EtIm+TfS− had been held in the fine pores. The content of EtIm+TfS− was found to be 19 vol % as calculated from the weight gain of the specimen. The results of measurement of ion conductivity of the impregnated specimen are shown in Table 1 and FIG. 1. The ion conductivity at 150° C. was as high as $2.5 \times 10^{-4}$ Scm$^{-1}$. The specimen after the ion conductivity measurement retained its original shape with no changes in weight and thickness, proving stable in high temperature. No liquid was found attached to the electrodes, showing satisfactory capability of the membrane to hold EtIm+TfS−.

EXAMPLE 2

The same procedures as in Example 1 were followed, except for using the microporous polyimide membrane PI-2 obtained in Synthesis Example 2. After impregnation with EtIm+TfS−, the specimen turned deeper in hue, suggesting that EtIm+TfS− had been held in the fine pores. The EtIm+TfS− content was found to be 66 vol % as calculated from the weight gain of the specimen. The results of measurement of ion conductivity of the impregnated specimen are shown in Table 1 and FIG. 1. The ion conductivity at 150° C. was as high as $2.6 \times 10^{-3}$ Scm$^{-1}$. The specimen after the ion conductivity measurement retained its original shape with no changes in weight and thickness, proving stable in high temperature. No liquid was found attached to the electrodes, showing satisfactory capability of the membrane to hold EtIm+TfS−.

TABLE 1

| | Ion Conductivity (Scm$^{-1}$) | |
|---|---|---|
| Temperature (° C.) | Example 1 | Example 2 |
| 50 | $5.1 \times 10^{-5}$ | $4.7 \times 10^{-4}$ |
| 80 | $1.1 \times 10^{-4}$ | $7.1 \times 10^{-4}$ |
| 120 | $1.4 \times 10^{-4}$ | $1.6 \times 10^{-3}$ |
| 150 | $2.5 \times 10^{-4}$ | $2.6 \times 10^{-3}$ |

COMPARATIVE EXAMPLE 1

The microporous polyimide membrane PI-1 obtained in Synthesis Example 1 was used as such (without impregnation) as a specimen of ion conductivity measurement. No ion conductivity was exhibited.

COMPARATIVE EXAMPLE 2

The microporous polyimide membrane PI-2 obtained in Synthesis Example 2 was used as such (without impregnation) as a specimen of ion conductivity measurement. No ion conductivity was exhibited.

EXAMPLE 3

Figure 2:
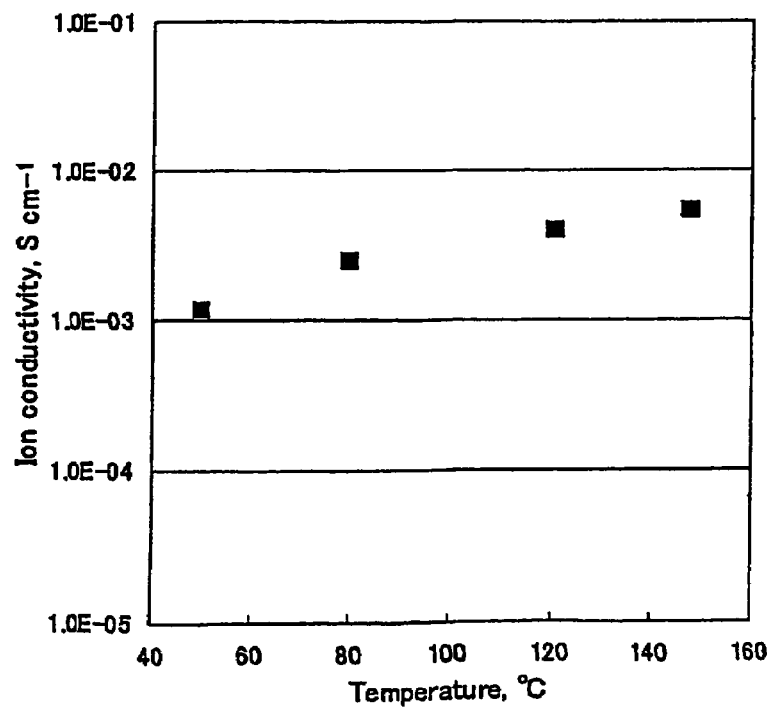
FIG. 2 is a graph showing temperature dependence of ion conductivity of the polymer electrolyte membrane prepared in Example 3.

The sulfo-containing polyether sulfone obtained in Synthesis Example 4 and EtIm+TfS− obtained in Synthesis Example 3 were dissolved in N,N-dimethylacetamide in concentrations of 6.72 wt % and 27.6 wt %, respectively (weight ratio: 20/80). A disk-shaped specimen having a diameter of 13 mm was cut out of the microporous polyimide membrane PI-2 obtained in Synthesis Example 2. The specimen was impregnated with the resulting solution by vacuum suction. The vacuum suction was ended while both sides of the specimen were wet. After both sides of the specimen were lightly wiped to remove the excess of the solution, it was dried in vacuo at 60° C. for 2 hours, at 120° C. for 12 hours, and at 150° C. for 2 hours to remove the solvent. After the impregnation operation, the specimen became deeper in hue and was tacky on both sides, indicating that the sulfo-containing polyether sulfone and EtIm+TfS− had been held in the fine pores and on each side. The specimen's thickness increased from 75 µm to 108 µm. The content of the sulfo-containing polyether sulfone and EtIm+TfS− was found to be 74 wt % as calculated from the weight gain of the specimen. The results of measurement of ion conductivity of the impregnated specimen are shown in Table 2 and FIG. 2. The ion conductivity at 148° C. was as high as $5.3 \times 10^{-3}$ Scm$^{-1}$. The specimen after the ion conductivity measurement retained its original shape with no changes in weight and thickness, proving stable in high temperature. No liquid was found attached to the electrodes, showing satisfactory capability of the membrane to hold the sulfo-containing polyether sulfone and EtIm+TfS−.

TABLE 2

| Temperature (° C.) | Ion Conductivity (Scm$^{-1}$) |
|---|---|
| 50 | $1.2 \times 10^{-3}$ |
| 80 | $2.5 \times 10^{-3}$ |
| 121 | $4.0 \times 10^{-3}$ |
| 148 | $5.3 \times 10^{-3}$ |

EXAMPLE 4

The sulfo-containing polyether sulfone obtained in Synthesis Example 6 and EtIm+TfS- obtained in Synthesis Example 3 were dissolved in N,N-dimethylacetamide each in a concentration of 12 wt % (weight ratio: 50/50).

Figure 3:
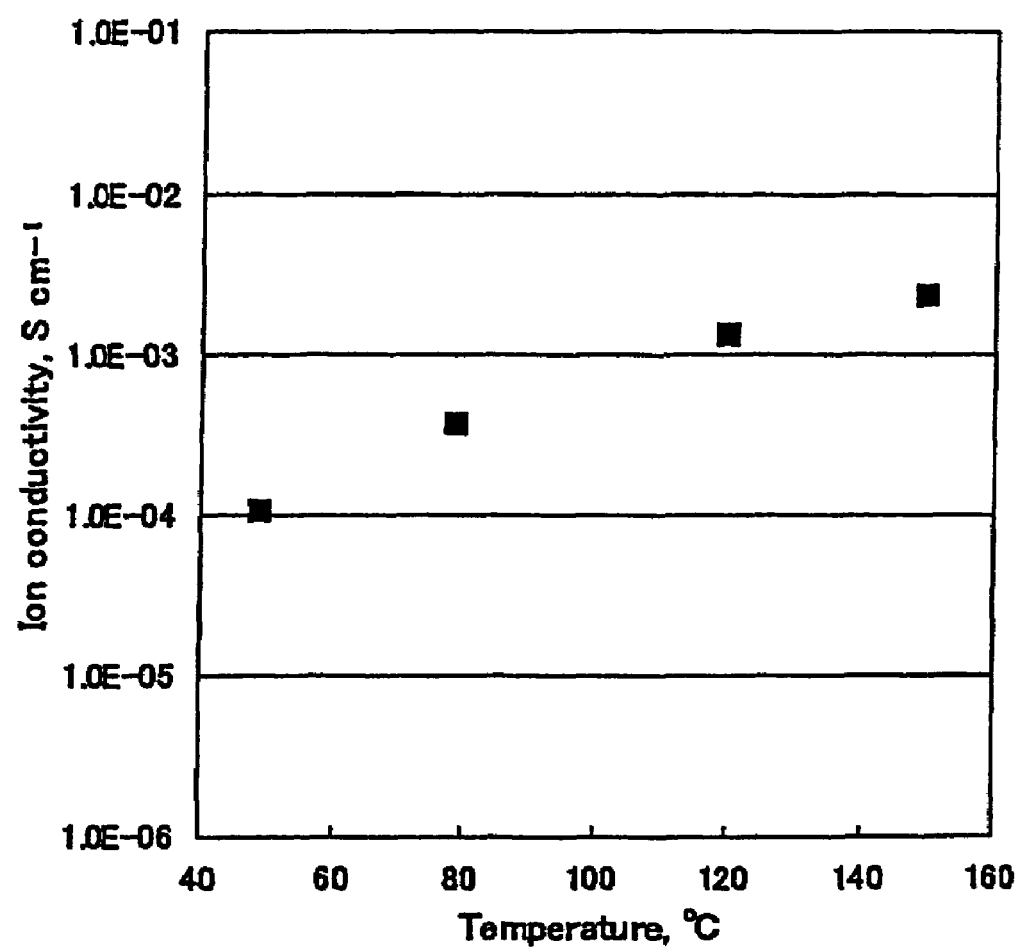
FIG. 3 is a graph showing temperature dependence of ion conductivity of the polymer electrolyte membrane prepared in Example 4.

A disk-shaped specimen having a diameter of 13 mm was cut out of the microporous polyimide membrane PI-2 obtained in Synthesis Example 2. The specimen was impregnated with EtIm+TfS- by vacuum suction. The vacuum suction was ended while both sides of the specimen were wet. The specimen became deeper in hue, which indicated that EtIm+TfS- had been held therein. The above-prepared solution of the sulfo-containing polyether sulfone and EtIm+TfS- was applied to both sides of the impregnated specimen and dried in vacuo at 60° C. for 2 hours, as 120° C. for 12 hours, and at 150° C. for 2 hours to remove the solvent. A film of the sulfo-containing polyether sulfone and EtIm+TfS- was thus formed on each side. The resulting specimen was tacky on both sides. The specimen's thickness increased from 75 μm to 127 μm. The content of the sulfo-containing polyether sulfone and EtIm+TfS- was found to be 79 wt % as calculated from the weight gain of the specimen. The results of measurement of ion conductivity of the impregnated specimen are shown in Table 3 and FIG. 3. The ion conductivity at 150° C. was as high as $2.3 \times 10^{-3}$ Scm$^{-1}$. The specimen after the ion conductivity measurement retained its original shape with no changes in weight and thickness, proving stable in high temperature. No liquid was found attached to the electrodes, showing satisfactory capability of the membrane to hold the sulfo-containing polyether sulfone and EtIm+TfS-.

TABLE 3

| Temperature (° C.) | Ion Conductivity (Scm$^{-1}$) |
|---|---|
| 49 | $1.1 \times 10^{-4}$ |
| 79 | $3.6 \times 10^{-4}$ |
| 120 | $1.3 \times 10^{-3}$ |
| 150 | $2.3 \times 10^{-3}$ |

INDUSTRIAL APPLICABILITY

The present invention provides an inexpensive and yet durable polymer electrolyte membrane which exhibits excellent mechanical strength, maintains its structure even in high temperatures, stably holds a molten salt in its porous polymer membrane structure, shows high heat resistance, and secures high ionic conductivity in the absence of water or a solvent and is therefore useful in fuel cells, secondary batteries, electric double layer capacitors, electrolytic capacitors, and the like and processes of producing the same.

The invention claimed is:

1. A polymer electrolyte membrane, comprising:
a microporous polymer membrane having pores penetrating through opposite sides thereof, the microporous polymer membrane being a microporous polyimide polymer membrane with the polyimide constituting the microporous polyimide membrane comprising at least 1 mol % of 3,3'-dihydroxy-4,4'-diaminobiphenyl based on a total diamine component, the microporous polymer membrane containing a mixture of a polymer and a molten salt at a weight ratio of 1/99 to 99/1 and/or a molten salt,
wherein the microporous polymer membrane comprises a heat-resistant aromatic polymer having no glass transition temperature below 100° C.,
the microporous polymer membrane has a percentage of void of 10 to 90% by volume, and
the molten salt has a melting point of 100° C. or lower.

2. The polymer electrolyte membrane according to claim 1, wherein the microporous polymer membrane contains the molten salt.

3. The polymer electrolyte membrane according to claim 1, wherein the microporous polymer membrane holds the mixture of the polymer and the molten salt in the pores thereof.

4. The polymer electrolyte membrane according to claim 1, wherein the microporous polymer membrane holds the mixture of the polymer and the molten salt in the pores thereof and on both sides thereof.

5. The polymer electrolyte membrane according to claim 1, wherein the microporous polymer membrane contains the molten salt in the pores thereof and has a layer comprising the mixture of the polymer and the molten salt provided on both sides thereof.

6. The polymer electrolyte membrane according to claim 1, wherein the microporous polymer membrane has an average pore size of 0.01 to 50 μm.

7. The polymer electrolyte membrane according to claim 1, wherein the polymer of the mixture is a caution exchange group-containing polymer.

8. The polymer electrolyte membrane according to claim 7, wherein the caution exchange group is a sulfuric group, a carboxyl group or a phosphoric group, and the caution exchange group-containing polymer has an ion exchange capacity of 0.3 to 7 meq/g.

9. The polymer electrolyte membrane according to claim 1, wherein the molten salt has an ammonium ion as a cation component.

10. The polymer electrolyte membrane according to claim 1, which has a content of the mixture of the polymer and the molten salt of 1 to 99% by weight.

11. The polymer electrolyte membrane according to claim 1, which has a content of the molten salt of 1 to 90% by volume.

12. The polymer electrolyte membrane according to claim 1, wherein the molten salt has a melting point of 80° C. or lower.

* * * * *